United States Patent
Beattie, Jr. et al.

(10) Patent No.: US 7,954,010 B2
(45) Date of Patent: May 31, 2011

(54) METHODS AND APPARATUS TO DETECT AN ERROR CONDITION IN A COMMUNICATION NETWORK

(75) Inventors: James Gordon Beattie, Jr., Bergenfield, NJ (US); Stephen J. Griesmer, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 230 days.

(21) Appl. No.: 12/333,917

(22) Filed: Dec. 12, 2008

(65) Prior Publication Data

US 2010/0153787 A1    Jun. 17, 2010

(51) Int. Cl.
G06F 11/00    (2006.01)

(52) U.S. Cl. ............ 714/43; 714/25; 714/27; 714/47.1; 370/245; 370/252

(58) Field of Classification Search .................. 714/43, 714/25, 27, 47.1; 370/245, 252
See application file for complete search history.

(56) References Cited

U.S. PATENT DOCUMENTS

| | | | |
|---|---|---|---|
| 6,073,089 A | 6/2000 | Baker et al. | |
| 6,252,852 B1 * | 6/2001 | Rowles et al. | 370/242 |
| 6,377,907 B1 | 4/2002 | Waclawski | |
| 6,445,774 B1 * | 9/2002 | Kidder et al. | 379/9.03 |
| 6,499,117 B1 * | 12/2002 | Tanaka | 714/49 |
| 6,651,099 B1 | 11/2003 | Dietz et al. | |
| 6,708,137 B2 * | 3/2004 | Carley | 702/179 |
| 6,754,664 B1 * | 6/2004 | Bush | 1/1 |
| 6,801,940 B1 | 10/2004 | Moran et al. | |
| 6,823,383 B2 | 11/2004 | MacBride | |
| 6,885,641 B1 * | 4/2005 | Chan et al. | 370/252 |
| 7,069,177 B2 | 6/2006 | Carley | |
| 7,133,677 B2 | 11/2006 | Feder et al. | |
| 7,142,820 B1 * | 11/2006 | Rajala | 455/67.7 |
| 7,305,485 B2 | 12/2007 | Chang et al. | |
| 7,376,969 B1 | 5/2008 | Njemanze et al. | |
| 7,509,229 B1 * | 3/2009 | Wen | 702/179 |
| 7,619,979 B2 * | 11/2009 | Phelan et al. | 370/242 |
| 7,640,460 B2 * | 12/2009 | Bahl et al. | 714/47 |
| 7,688,951 B1 * | 3/2010 | Bajpay et al. | 379/9.03 |
| 7,693,042 B1 * | 4/2010 | Wei | 370/216 |
| 7,889,666 B1 * | 2/2011 | Pei et al. | 370/242 |
| 2005/0033631 A1 * | 2/2005 | Wefers et al. | 705/10 |
| 2005/0235058 A1 * | 10/2005 | Rackus et al. | 709/224 |
| 2006/0159011 A1 | 7/2006 | Dalal et al. | |
| 2007/0019549 A1 * | 1/2007 | Okabe | 370/232 |
| 2007/0260911 A1 * | 11/2007 | Marilly et al. | 714/4 |
| 2008/0091822 A1 * | 4/2008 | Sheinfeld et al. | 709/224 |
| 2008/0159154 A1 | 7/2008 | Bajpay et al. | |
| 2009/0037763 A1 * | 2/2009 | Adhya et al. | 714/4 |
| 2010/0037318 A1 * | 2/2010 | French et al. | 726/23 |
| 2010/0054140 A1 * | 3/2010 | St. Jernholm et al. | 370/252 |

* cited by examiner

*Primary Examiner* — Scott T Baderman
*Assistant Examiner* — Loan Truong
(74) *Attorney, Agent, or Firm* — Hanley, Flight & Zimmerman LLC

(57) ABSTRACT

Methods and apparatus to detect an error condition in a communication network are disclosed herein. An example method of detecting an error condition in a communication network includes collecting first metric data from a first endpoint device, the first metric data being related to a first connection between the first endpoint device and a communication network; collecting second metric data from a second endpoint device, the second metric data being related to a second connection between the second endpoint device and the communication network; determining if at least one of the first and second metric data are indicative of the error condition; when the at least one of the first and second metric data are indicative of the error condition, identifying a point of correlation between the first and second connections; identifying a network element based on the point of correlation; and performing an evaluation of the network element.

16 Claims, 6 Drawing Sheets

| TIME OF COLLECTION | METRIC DATA | | | |
|---|---|---|---|---|
| ON CONNECTION STARTUP | CONNECTION IDENTIFIER | CONNECTION START TIME | CONNECTION DIAGNOSTIC | CONNECTION PEER ID |
| ON CONNECTION CLOSE | CONNECTION IDENTIFIER | CONNECTION CLOSE TIME | CONNECTION DIAGNOSTIC | CONNECTION PEER ID |
| DURING CONNECTION LIFETIME | CONNECTION IDENTIFIER | CONNECTION STATUS TIME | CONNECTION DIAGNOSTIC | CONNECTION PEER ID |
| | REMOTE PEER $ID_1$ | PACKETS SENT TO PEER 1 | PACKETS RE-SENT TO PEER 1 | PACKETS RECEIVED FROM PEER 1 |
| | CONNECTION LATENCY Z-A BETWEEN PEER 1 | | CONNECTION LATENCY A-Z BETWEEN PEER 1 | |
| | REMOTE PEER $ID_2$ | PACKETS SENT TO PEER 2 | PACKETS RE-SENT TO PEER 2 | PACKETS RECEIVED FROM PEER 2 |
| | CONNECTION LATENCY Z-A BETWEEN PEER 2 | | CONNECTION LATENCY A-Z BETWEEN PEER 2 | |
| | REMOTE PEER $ID_N$ | PACKETS SENT TO PEER N | PACKETS RE-SENT TO PEER N | PACKETS RECEIVED FROM PEER N |
| | CONNECTION LATENCY Z-A BETWEEN PEER N | | CONNECTION LATENCY A-Z BETWEEN PEER N | |

FIG. 2

METHODS AND APPARATUS TO DETECT AN ERROR CONDITION IN A COMMUNICATION NETWORK

FIELD OF THE DISCLOSURE

The present disclosure relates generally to networks and, more particularly, to methods and apparatus to detect an error condition in a communication network.

BACKGROUND

Enterprise customers are increasingly adopting multiprotocol label switching (MPLS) based virtual private network (VPN) services to implement a communication network among their respective customer sites via a service provider's network. Such MPLS-based VPNs provide direct any-to-any reachability among an enterprise's customer sites. An enterprise customer may, for example, deploy voice over Internet protocol (VoIP) services and/or local area network (LAN) based data services to their customer sites via their respective VPN.

BRIEF DESCRIPTION OF THE DRAWINGS

FIG. 2 is an example chart listing example metric data to be collected by the example virtual private network (VPN) automated network fault analysis (VANFAN) server of FIG. 1.

DETAILED DESCRIPTION

Figure 1:
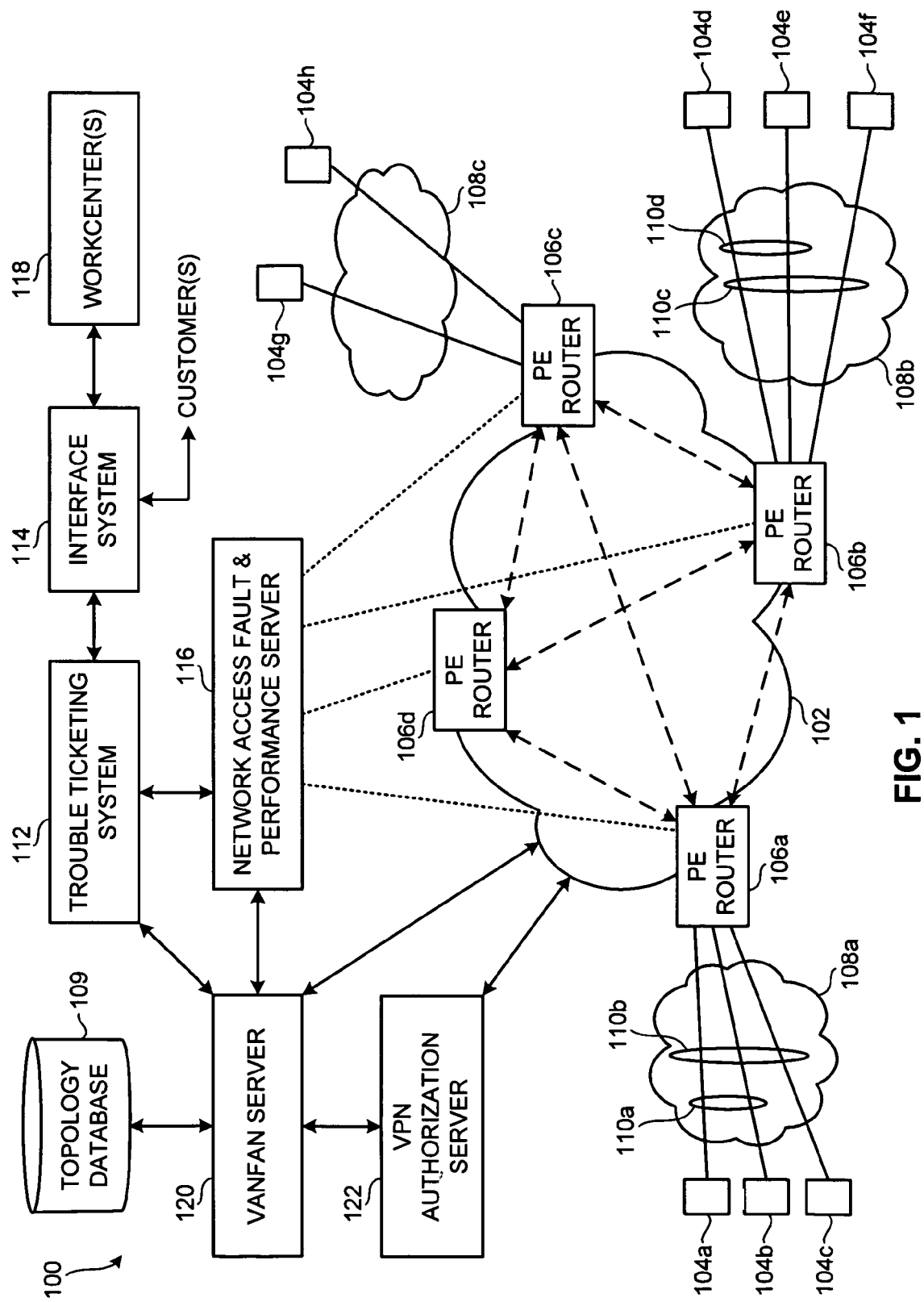
FIG. 1 is a schematic illustration of an example communication system.

Although the following discloses example methods, apparatus, systems, and/or articles of manufacture including, among other components, firmware and/or software executed on hardware, it should be noted that such methods, apparatus, systems, and/or articles of manufacture are merely illustrative and should not be considered as limiting. For example, it is contemplated that any or all of the firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

Users of communication networks sometimes experience service degradations, chronic failures, and/or other types of connectivity problems (collectively referred to herein as service interruptions) related to the transfer of information over the communication networks. Avoidance and/or rapid resolution of such interruptions is important as delayed resolution of a problem may increase customer dissatisfaction and/or result in other portions of the communication network experiencing service interruptions. Accordingly, service providers administering the communication networks dedicate resources to avoiding, detecting, and resolving service interruptions. Despite such efforts, error conditions that cause service interruptions may go undetected and/or unresolved for undesirable periods of time. Because error conditions may worsen over time and may compound other existing problematic conditions, a failure to promptly detect and/or address an error condition can lead to more significant interruptions.

To detect and/or resolve error conditions as soon as possible, such as before the error conditions cause a service interruption noticeable to users, some service providers employ a system of alarms located throughout a communication network. Due to the many interactions and interdependencies between network elements, a single failure can cause a large number of alarms to be triggered, making identification of the root cause of the problem difficult. The underlying cause of the alarm-triggering error condition can be easily lost in the expansive alarm system. In such instances, for lack of better options, service providers may opt to collect data from a massive amount of network elements, including those remotely related to or associated with an alarm, in an attempt to identify the problematic portion(s) of the communication network. Mass data collection from network elements can substantially increase the load on the network, forcing service providers to sacrifice data transfer speeds and/or available bandwidth, thereby adversely affecting customer service. Further, to implement mass data retrievals from large numbers of network elements in a timely fashion, service providers use a large number of servers which can be a costly investment in assets. The resulting delays in isolating and resolving the error conditions lead to higher probabilities that the error conditions will intensify and cause service interruptions that are noticeable to one or more users.

The example methods, apparatus, systems, and/or articles of manufacture described herein implement an automated root cause investigation of network elements. The example investigation identifies and/or isolates one or more network elements causing or experiencing error condition(s), preferably before the error condition(s) become hard failures or before the error conditions cause service interruptions significant enough to cause customer reports of connectivity problem(s). That is, the predictive aspects of the example investigation described herein enable a service provider to resolve certain error conditions before the degree of the associated service degradation exceeds a level at which a service interruption will occur. Further, the example investigation described herein enables a service provider to automatically pinpoint a root cause or source of an existing or potential error condition.

In particular, the example methods, apparatus, systems, and/or articles of manufacture described herein use metric data gathered from network endpoints to monitor the status of network conditions. Metric data is collected from a single endpoint connection and/or a set of endpoint connections, such as endpoints sharing a point of correlation, over a certain time interval. Metric data including, for example, numbers of connection losses, latency, and packet loss rates associated with the endpoints are conveyed to a dedicated server to be used in an analysis. When the dedicated server determines that one or more thresholds associated with metric data are exceeded, the dedicated server causes a diagnostic examination of fault and/or performance data related to the underlying network elements.

Depending on the examination of the fault and/or performance data, the dedicated server may generate one or more trouble tickets identifying the problematic network element(s) and, if necessary, may convey the trouble ticket(s)

to one or more workcenter(s). Given the specific identity of the problematic network element(s), the workcenter(s) can dispatch personnel to resolve the error condition(s) and/or service interruption(s) in a focused, direct manner. Thus, the metric data collected at the endpoint devices enables a rapid and efficient resolution of service interruptions and/or error conditions having the potential to cause service interruptions.

In the interest of brevity and clarity, throughout the following disclosure, reference will be made to an example communication system 100 and/or an example service provider network 102 of FIG. 1. However, the example methods, apparatus, systems, and/or articles of manufacture described herein to detect error conditions in networks are applicable to other types of systems and/or networks constructed using other technologies, topologies, and/or protocols, and/or to other types of communication sessions and/or communication applications, and/or to other service providers and/or types of service providers.

FIG. 1 illustrates the example communication system 100. To facilitate communication between a plurality of endpoint devices, eight of which are designated at reference numerals 104a-h, the example communication system 100 of FIG. 1 includes the example service-provider network 102. The example endpoint devices 104a-h of FIG. 1 comprise personal computer(s), set-top box(es), personal digital assistant(s), voice over Internet protocol (VoIP) device(s), router(s), media gateway(s), server(s), and/or any other device capable of transferring information over a network.

The example service-provider network 102 of FIG. 1 includes a plurality of provider edge (PE) routers, four of which are designated at reference numerals 106a-d. The example PE routers 106a-d of FIG. 1 are communicatively coupled to each other via a plurality of communication paths that enable any of the PE routers 106a-d to communicate directly with any or a subset of the other PE routers 106a-d. The PE routers 106a-d select routes through the plurality of communication paths within the service-provider network 102 based on any type and/or number of algorithm(s), logic, method(s) and/or rule(s) selected and/or implemented by a vendor of the PE routers 106a-d and/or an operator of the service-provider network 102. The example PE routers 115a-d may be coupled in a full or partial mesh topology.

In the illustrated example of FIG. 1, the service-provider network 100 implements a virtual private network (VPN) to which the example endpoint devices 104a-h can connect via the PE routers 106a-d. In the illustrated example of FIG. 1, endpoints 104a-h have a VPN application (not shown) installed thereon to enable user connectivity to the VPN. For example, the endpoint devices 104a-h can execute VPN client software when attempting to establish communication with the VPN. The VPN application is provided by, for example, a service provider operating the network 102, a vendor of the PE routers 106a-d, or any other suitable source.

To enable the VPN, each of the PE routers 106a-d has a VPN routing and forwarding (VRF) table (not shown). The VRF table defines which PE router(s) 106a-d are used to communicatively couple the various endpoint devices 104a-h to the service-provider network 102. That is, the VRF tables are used by the PE routers 106a-d to route and/or forward a packet received at a particular PE router 106a-d to a destination.

In the example communication system 100 of FIG. 1, the endpoint devices 104a-h are coupled to the service-provider network 102 via any of a plurality of access networks, three of which are designated at reference numerals 108a-c. The access networks 108a-c may each comprise a Digital Subscriber Line (DSL) network, a broadband cable network, a local area network (LAN), or any other type of network capable of communicatively coupling the endpoint devices 104a-h to the service-provider network 102. The access networks 108a-c employ a plurality of network elements, such as switches, routers, hubs, gateways, etc. to provide connectivity to the service-provider network 102 via a configured transmission path (sometimes referred to herein as a customer circuit). Customer circuits can be configured and/or designed according to such factors as geographic location, service type(s), and/or specifications, such as bandwidth requirements and/or transmission speed.

To store information related to the topology, the configuration, and/or the devices of the example service-provider network 102, the example communication system 100 of FIG. 1 includes a topology database 109. Example information stored in the example topology database 109 includes one or more lists of PE routers 106a-d that form part of customer circuits communicatively coupling the endpoint devices 104a-h to the service-provider network 102. Thus, the example topology database 109 can be referenced to determine a customer circuit associated with one of the endpoint devices 104a-h and/or other identifying information corresponding to one or more network elements. The example topology database 109 may be implemented using any number and/or type(s) of data structures, and may be stored in any number and/or type(s) of memory(ies), memory device(s), volatile storage device(s), and/or non-volatile storage device(s).

Some of the example endpoint devices 104a-h of FIG. 1 share one or more points of correlation, four of which are designated at reference numerals 110a-d in FIG. 1, along the customer circuits or transmission paths to and from the service-provider network 102. As used herein, a point of correlation refers to a point shared between two or more endpoint devices 104a-h that are part of a VPN connectivity set. A VPN connectivity set includes two or more endpoint devices 104a-h that utilize a common network element, such as a hub or router, to establish connectivity to the service-provider network 102. That is, a point of correlation for two endpoint devices refers to an intersection of the respective transmission paths or customer circuits associated with the two endpoint devices and the service-provider network 102. As shown in FIG. 1, some of the endpoint devices 104a-h belong to more than one VPN connectivity set depending on which location along the transmission path to the service-provider network 102 is used as a reference point.

For example, as shown in FIG. 1, a first endpoint device 104a and a second endpoint device 104b have a first point of correlation 110a in a first access network 108a. In addition, the first endpoint device 104a and the second endpoint device 104b have a second point of correlation 110b in the first access network 108a. The first and second endpoint devices 104a and 104b share the second point of correlation 110b with a third endpoint device 104c. A similar configuration for a fourth, fifth, and sixth endpoint device 104d, 104e, and 104f, respectively, having points of correlation 110c and 110d are shown in a second access network 108b in the example of FIG. 1. Additionally or alternatively, as shown in a third access network 108c of FIG. 1 communicatively coupling a seventh endpoint device 104g and an eighth endpoint device 104h to the service-provider network 102, certain endpoint devices may not have points of correlation before reaching one of the PE routers 106a-c.

While the example points of correlation 110a-d of FIG. 1 are located in the example access networks 108a-c, other example configurations include different points of correlations at different locations of the example communication system 100. For example, the example PE routers 106*a-c* of FIG. 1 are also points of correlation, although not labeled as such in the illustrated example. Further, as described above, the endpoint devices 104*a-h* may comprise routers, proxy servers, and/or hubs themselves associated with two or more endpoints within, for example, a local area network (LAN). Such routers proxy servers, and/or hubs can be points of correlation for purposes of the example methods, apparatus, systems, and/or articles of manufacture described herein. Further, the service-provider network 102 may include one or more points of correlation.

In the illustrated example, the VPN connectivity sets and the endpoint devices 104*a-h* included therein are stored in the example topology database 109. For example, the topology database 109 can include a data structure having a plurality of VPN connectivity sets stored in association with the endpoint devices 104*a-h* forming the corresponding VPN connectivity set(s). Additionally or alternatively, entries in the example topology database 109 of FIG. 1 may include and/or be defined by points of correlation 110*a-d* for each VPN connectivity set. As a result, the topology database 109 may be referenced to determine one or more points or network elements, in the service-provider network 102 that is shared between two or more members of a VPN connectivity set.

User(s) of the endpoint devices 104*a-h*, which are referred to herein as customers, may experience service interruptions during which connectivity to the VPN is lost or degraded. In the illustrated example of FIG. 1, a customer experiencing a service interruption can submit a report to a trouble ticketing system 112 via an interface system 114. The example interface system 114 of FIG. 1 implements one or more user interfaces that enable customers and/or customer-service representatives associated with the service-provider network 102 to access the example trouble ticketing system 114. Example user interfaces are web-based interfaces that enable a user to generate, submit, search, cancel, and/or close trouble tickets. The example interface system 114 of FIG. 1 can also convey notice(s), such as a confirmation of receipt or a scheduled maintenance appointment, via electronic mail and/or facsimile to customers and/or customer-service representatives.

In response to receiving a customer report involving a service interruption, the trouble ticketing system 112 generates a trouble ticket having information specific to the submitting customer, an associated customer circuit of the service-provider network 102, and/or any problem(s) indicated in the report. In such instances, the trouble ticketing system 114 conveys the trouble ticket to a network access fault and performance server (NAFPS) 116. As described in greater detail below, the example NAFPS 116 of FIG. 1 evaluates the status, performance, and/or other indicative metrics associated with network element(s) such as, for example, one or more of the PE routers 106*a-d*.

The result(s) generated by the example NAFPS 116 can be fed back through the example interface system 114 of FIG. 1 or otherwise forwarded to one or more workcenters 118. In other examples, such as when a customer submitted report involves a fairly simple problem that can be easily resolved, the trouble ticketing system 112 may convey the corresponding trouble ticket to the workcenter(s) 118 without first instructing the NAFPS 116 to perform an evaluation. The example workcenter(s) of FIG. 1 are capable of troubleshooting, diagnosing, and/or resolving the problem identified in the submitted report and/or the results of the evaluation performed by the NAFPS 116. For example, the workcenter(s) 118 may replace or reconfigure (or send an order to replace or reconfigure) the components, such as gateways, routers, and/or switches, of one of the PE routers 106*a-d* identified as a cause of an error condition and/or determined to be problematic in any of a number and/or type of aspects.

The example trouble ticketing system 112 of FIG. 1 also receives report(s) of error condition(s), service interruption(s), and/or potential service interruption(s) from an example VPN automated network fault analysis (VANFAN) server 120. The example VANFAN server 120 of FIG. 1 is dedicated to detecting error conditions in the example communication system 100 currently causing service interruptions and/or error conditions having the potential to cause service interruptions. In particular, the example VANFAN server 120 of FIG. 1 collects metric data from the endpoint devices 104*a-h* to be used in an analysis of the connectivity experienced by the endpoint devices 104*a-h*.

As described above, the endpoint devices 104*a-h* have at least one VPN application installed thereon to enable the endpoint devices 140*a-h* to connect to and communicate over the VPN. In the example communication system 100 of FIG. 1, the VPN application is bundled with an example VANFAN application when made available to the endpoint devices 104*a-h* via, for example, when downloaded from an Internet web site. Additionally or alternatively, the VANFAN application may be made available to customers separately from the VPN application. When installed on the endpoint devices 104*a-h*, the example VANFAN application enables the example VANFAN server 120 to collect the metric data described herein. In the illustrated example, the VANFAN application of the endpoint devices 104*a-h* sends information to the VANFAN server 120 when a VPN connection is started, closed, lost, and/or periodically during a lifetime of the VPN connection. In other examples, the VANFAN server 120 may periodically query the VANFAN application on the endpoint devices 104*a-h* for information over time. In such instances, the VANFAN application will have stored metric data regarding VPN connection(s) at and/or during the times described above. The data can then by conveyed to the example VANFAN server 120 for analysis. As described below, the metric data collected from one of the endpoint devices 104*a-h*, such as the first endpoint device 104*a*, may be analyzed independently and/or in conjunction with metric data collected from another one of the endpoint devices 104*a-h*, such as the second endpoint device 104*b*. In some examples, when metric data from multiple endpoint devices 104*a-h* is analyzed together, the endpoint devices 104*a-h* to be analyzed together are determined by the correlation points 110*a-d*, which can define a VPN connectivity set.

FIG. 2 is an example chart 200 listing example metric data 202 to be collected by the example VANFAN server 120 from the endpoint devices 104*a-h*, along with example times 204 at which each example metric is collected. For purposes of this description, the VANFAN server 120 is said to be collecting metric data from the first endpoint device 104*a*. Upon startup of a VPN connection by the first endpoint device 104*a*, the example metric data 202 to be collected by the example VANFAN server 120 of FIG. 1 includes a connection identifier, which is a tag or code assigned to the first endpoint device 104*a* from which the VPN connection is being started; a connection start time; a connection diagnostic, which indicates whether the VPN connection was successfully started or failed to start; and a connection peer identifier list, which may be a list of one or more peers of the first endpoint device 104*a*, such as one or more of the other endpoint devices 104*b-h*. Additionally or alternatively, the connection peer identifier list collected at the start of the VPN connection can indicate the status of the VPN connection(s) associated with any peer endpoint devices at the time of opening the VPN connection associated with the first endpoint device 104*a*.

At the close of the VPN connection associated with the first endpoint device 104a, the example metric data 202 to be collected by the example VANFAN server 120 of FIG. 1 includes a connection identifier. A connection identifier is a tag or code assigned to the first endpoint device 104a from which the VPN connection is being closed. The metric data 202 associated with the closure of a connection also includes a connection close time; a connection diagnostic, which indicates whether the VPN connection was closed normally or abnormally; and a connection peer identifier list, which is a list of one or more peers of the first endpoint device 104a, such as one or more of the other endpoint devices 104b-h. Additionally or alternatively, the connection peer identifier list collected at the close of the VPN connection can indicate the status of the VPN connection(s) associated with any peer endpoint devices at the time of closing the VPN connection associated with the first endpoint device 104a.

During the lifetime of the VPN connection associated with the first endpoint device 104a, the example metric data 202 to be collected by the example VANFAN server 120 of FIG. 1 includes a connection identifier, which is a tag or code assigned to the first endpoint device 104a from which the VPN connection is established; a connection status time, which is a timestamp associated with a point in time at which the metric data is collected; a connection diagnostic, which indicates whether the first endpoint device 104a is connected to the VPN connection and/or the quality of the connection to the VPN; and a connection peer identifier list, which is a list of one or more peers of the first endpoint device 104a, such one or more of the other endpoint devices 104b-h. Additionally or alternatively, the connection peer identifier list collected during the lifetime of the VPN connection can indicate the status of the VPN connection(s) associated with any peer endpoint devices during the time indicated by the connection status time data described above.

Other example metric data 202 to be collected by the example VANFAN server 120 of FIG. 1 during the lifetime of the VPN connection associated with the first endpoint device 104a includes one or more sets of information corresponding to one or more remote peers of the first endpoint device 104a, as listed in the connection peer identifier described above. As shown in the example chart 200 of FIG. 2, a first example set of information 206 corresponding to a first remote peer includes a number of packets, such as Internet protocol (IP) packets, sent from the first endpoint device 104a to the first remote peer; a number of packets that were re-sent from the first endpoint device 104a to the first remote peer; a number of packets received at the first endpoint device 104a from the first remote peer; a connection latency in a first transmission direction (Z to A) between the first endpoint device 104a and the first remote peer; and a connection latency in a second transmission direction (A to Z) between the first endpoint device 104a and the first remote peer. Connection latency refers to a delay associated with a transfer of a signal from a transmitting end to a receiving end. Latency metrics can include a time of travel and/or a time of processing associated with each end of the transmission.

Additional sets of information 208 and 210 corresponding to a second remote peer and third remote peer are shown in the example chart 200 of FIG. 2. The metrics of these sets of information 208 and 210 are similar to those of the metrics collected in association with the first remote peer described above. In some examples, collection of the metric data during the lifetime of the VPN connection may be repeated for one or more of the remote peers listed in the peer identifier list throughout the lifetime of the VPN connection. In such instances, a timestamp may be stored in association with each collection of metric data. While example metric data to be collected by the example VANFAN server 120 of FIG. 1 is listed in the example chart of FIG. 2, additional or alternative metrics may be collected.

Referring back to FIG. 1, the example VANFAN server 120 of FIG. 1 also receives information regarding VPN connections associated with the endpoint devices 104a-h from an example VPN authorization server 122. The example VPN authorization server 122 manages startup(s) and closure(s) of VPN connection(s) as requested by the endpoint devices 104a-h. For example, attempts to connect to the VPN using a username and/or password may be conveyed to the VPN authorization server 122 for permission to access the contents of the VPN. In the illustrated example, the VPN authorization server 122 may also track and store typical VPN startup and/or closure information or statistics associated with each endpoint device 104a-h, PE router 106a-d, and/or any other network elements of the service-provider network 102. In some instances, the example VANFAN server 122 of FIG. 1 may use the information from the VPN authorization server 122 in analyzing the metric data received from the endpoint devices 104a-d.

Using the metric data collected from one or more of the endpoint devices 104a-h, the example VANFAN server 120 performs an analysis to determine whether the collected metric data is indicative of potential and/or existing error condition(s) occurring in any network element(s) associated with that particular endpoint device 104a-h, such as the first endpoint device 104a in the example described above in connection with FIG. 2. In particular, the example VANFAN server 120 utilizes one or more thresholds in performing comparison(s) involving the collected metric data to determine the status of the corresponding VPN connection(s) and/or the network element(s) associated therewith.

For example, the VANFAN server 120 of FIG. 1 may compare a number of VPN connection failures associated with the first endpoint device 104a with a threshold number of connection failures configured according to one or more rules by, for example, an operator of the service-provider network 102 and/or a vendor of the first PE router 106a. For some types of metric data, such as a number of connection failures, the corresponding threshold may be a number per unit of time, such as a number of connection failures per hours, deemed to be indicative of an error condition. For other types of metric data, such as a number of abnormal connection closures, the corresponding threshold may be a ratio, such as a ratio of abnormal connection closures to closure attempts.

The example VANFAN server 120 of FIG. 1 includes different thresholds depending on the type of metric data being analyzed. Other example types of metric data to be compared with corresponding threshold(s) include failures to establish a connection, a number of re-sent packets, latency, and/or a number of differences between packets sent and peer-reported packets received. Thus, the example VANFAN server 120 includes a series of thresholds corresponding to each metric collected from the endpoint devices 104a-h. The series of thresholds can be divided into two groups: a first group to be used in an analysis of metric data of a single endpoint device 104a-h and a second group to be used in an analysis of metric data collected from multiple endpoint devices 104a-h, such as a VPN connectivity set. In some examples, the thresholds of the second group are set to a lower number relative to the thresholds of the first group.

If some or all of these metrics are determined to be excessive via a comparison with a corresponding threshold, the example VANFAN server 120 of FIG. 1 concludes that the collected metric data and/or the data received from the VPN authorization server 122 is indicative of existing and/or potential error condition(s). In response, the example VANFAN server 120 directs the example NAFPS 116 of FIG. 1 to perform a diagnostic evaluation of one or more network elements associated with the source of the problematic metric data. In the illustrated example, the analysis performed by the NAFPS 116 includes an isolation of a customer circuit, facility, and/or one or more network devices associated with the problematic metric data. In some examples, identifying information corresponding to the network element(s) associated with the underlying problematic metric data is provided to the NAFPS 116 by the VANFAN server 120. Additionally or alternatively, the example NAFPS 116 of FIG. 1 may reference the example topology database 109 to perform the isolation of the network elements to be evaluated.

Further, the example VANFAN server 120 and/or the example NAFPS 116 may utilize the example correlation points 110a-d of FIG. 1 to isolate the potential or existing problem. For example, in instances in which metric data from the first, second, and third endpoint devices 104a, 104b, and 104c, respectively, is being analyzed together, if each of the fore mentioned endpoint devices 104a-c are experiencing a similar amount of excessive latency or an excessive number of connection failures, the second correlation point 110b indicates that the first PE router 106a should be evaluated. On the other hand, if the first and second endpoint devices 104a-b are experiencing a similar amount of excessive latency or an excessive number of connection failures, but the third endpoint device 104c is not experiencing excessive latency or connection failures, the first and second correlation points 110a and 110b indicate that a network element (not shown) located between the first and second correlation points 110a and 110b should be evaluated. Other example determinations can be made using the metric data, the correlation points 110a-d, and/or the information received from the VPN authorization server 122.

After performing the diagnostic evaluation of the isolated network elements, the example NAFPS 116 returns the results to the VANFAN server 120. Using the results, the example VANFAN server 120 determines whether a trouble ticket should be generated. If so, the example VANFAN server 120 generates a trouble ticket including information regarding which network element(s) were evaluated and the results of the corresponding evaluation (s). Any other additional or alternative number and/or type(s) of information can be included on the trouble ticket(s). As described above, the example trouble ticketing system 112 receives the trouble tickets from the example VANFAN server 120 and forwards the same to the appropriate workcenter(s) 118 via the example interface system 114.

Figure 3:
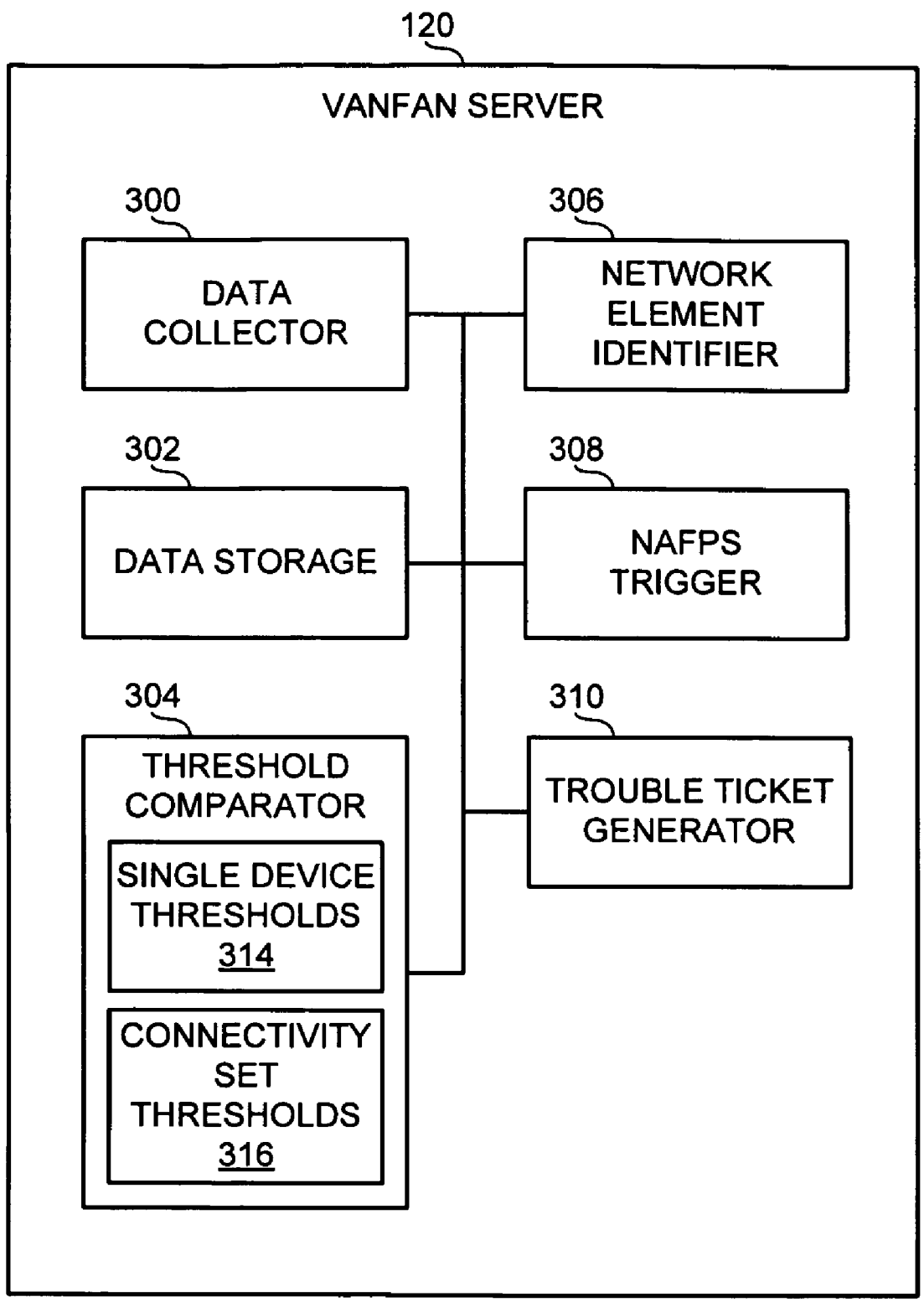
FIG. 3 is a block diagram of an example apparatus that may be used to implement the example VANFAN server of FIG. 1.

FIG. 3 is a block diagram of an example apparatus that may be used to implement the example VANFAN server 120 of FIG. 1. In the illustrated example of FIG. 3, the example VANFAN server 120 includes a data collector 300, a data storage 302, a threshold comparator 304, a network element identifier 306, a NAFPS trigger 308, and a trouble ticket generator 310. While an example manner of implementing the VANFAN server 120 of FIG. 1 has been illustrated in FIG. 3, one or more of the elements, processes and/or devices illustrated in FIG. 3 may be combined, divided, re-arranged, omitted, eliminated and/or implemented in any other way. Further, the example data collector 300, the example data storage 302, the example threshold comparator 304, the example network element identifier 306, the example NAFPS trigger 308, the example trouble ticket generator 310, and/or, more generally, the example VANFAN server 120 of FIG. 3 may be implemented by hardware, software, firmware and/or any combination of hardware, software and/or firmware. Thus, for example, any of the example data collector 300, the example data storage 302, the example threshold comparator 304, the example network element identifier 306, the example NAFPS trigger 308, the example trouble ticket generator 310, and/or, more generally, the example VANFAN server 120 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example data collector 300, the example data storage 302, the example threshold comparator 304, the example network element identifier 306, the example NAFPS trigger 308, the example trouble ticket generator 310, and/or, more generally, the example VANFAN server 120 of FIG. 3 are hereby expressly defined to include a tangible medium such as a memory, DVD, CD, etc. storing the software and/or firmware. Further still, the example VANFAN server 120 of FIG. 3 may include one or more elements, processes and/or devices in addition to, or instead of, those illustrated in FIG. 3, and/or may include more than one of any or all of the illustrated elements, processes and devices.

The example data collector 300 of FIG. 3 collects metric data from the endpoint devices 104a-h (FIG. 1). In the illustrated example, the data collector 300 communicates with a VANFAN application installed on the endpoint devices 104a-h. As described above, the VANFAN application may be part of or otherwise associated with VPN client software installed on the endpoint devices 104a-h to enable the transfer of information over the VPN implemented by the example service-provider network 102 (FIG. 1). The example data collector 300 is capable of scheduling collection(s) of data according to, for example, instructions from the example VANFAN server 120 (FIG. 1). In some examples, the data collector 300 collects metric data upon a startup of a VPN connection, a closure of a VPN connection, a failure of a VPN connection, and/or periodically during the lifetime of a VPN connection. Example types of metric data to be collected by the example data collector 300 of FIG. 3 are described above in connection with FIG. 2.

The example data storage 302 of FIG. 3 stores the metric data collected by the data collector 300 from the endpoint devices 104a-h. As described in greater detail below, the metric data may be used aperiodically, periodically, and/or according to a schedule implemented by the example threshold comparator 304. The example data storage 302 may be implemented using any number and/or type(s) of data structures, and may be any number and/or type(s) of memory(ies), memory device(s), volatile device(s), and/or non-volatile storage device(s). For example, the data storage 302 may be implemented by the example memories 524 and/or 525 of FIG. 5.

Additionally, the example data storage 302 of FIG. 3 stores information related to VPN connectivity sets with which the collected metric data is associated. That is, the example data storage 302 stores information in association with the metric data indicative of one or more VPN connectivity sets to which the corresponding endpoint device 104a-h belongs. For example, when storing metric data collected from the first endpoint device 104a, the example data storage 302 stores an indicator with the metric data indicating that the first endpoint device 104a belongs to a first VPN connectivity set defined by the first correlation point 110a (which also includes the second endpoint device 104b) and/or a second indicator with the metric data indicating that the first endpoint device 104a belongs to a second VPN connectivity set defined by the second correlation point 110b (which also includes the second endpoint device 104b and the third endpoint device 104c). The example data storage 302 of FIG. 3 obtains the information related to VPN connectivity sets from the example topology database 109.

The example threshold comparator 304 of FIG. 3 includes threshold information to be used in a series of comparisons with the metric data stored in the example data storage 302. In the illustrated example, the threshold comparator 304 includes an example group of single device thresholds 314 and an example group of connectivity set thresholds 316. When performing an analysis of metric data collected from one of the endpoint devices 104a-h, the example threshold comparator 304 uses the single device thresholds 314. When performing an analysis of metric data collected from more than one of the endpoint devices 104a-h, such as members of a VPN connectivity set, the example threshold comparator 304 uses the connectivity set thresholds 316. In some examples, the threshold comparator 304 may use average value(s) of the metric data collected from more than one endpoint device 104a-h when using the connectivity set thresholds 316. Additionally or alternatively, the threshold comparator 304 may use the single device thresholds 314 when performing an analysis of metric data collected from more than one of the endpoint devices 104a-h. In the illustrated example, the single device thresholds 314 are set relatively high in comparison with the connectivity set thresholds 316. In some examples, the threshold comparator 304 may include additional or alternative thresholds and/or settings thereof.

The example threshold comparator 304 performs comparisons involving the collected metric data according to one or more schedules. For example, the threshold comparator 304 may perform the comparisons once per hour, twice per day, or at any other suitable rate. In the illustrated example, the threshold comparator 304 employs a first schedule for use of the single device thresholds 314 and a second threshold for use of the connectivity set thresholds 316. These thresholds operate independently. However, in other examples, different schedules associated with different thresholds may be dependent on one another, such as when the second scheduled is accelerated if a default is found on a single device, etc.

The example threshold comparator 304 of FIG. 3 uses the results of the comparison(s) between the metric data and the thresholds 314 and/or 316 to determine whether excessive amount(s) of problematic metrics were collected from the endpoint device(s) 104a-h. That is, if one or more metrics exceed one or more of the thresholds 314 and/or 316, the example threshold comparator 304 concludes that an error condition may exist in a location of the service-provider network 102 associated with the corresponding endpoint device(s) 104a-h. If such a conclusion is reached, the example threshold comparator 304 causes a diagnostic evaluation of specific network elements associated with the endpoint devices 104a-h from which the metric data indicative of the error condition(s) was collected. As described above, the diagnostic evaluation is to be performed by the example NAFPS 116 of FIG. 1.

The example network element identifier 306 is capable of determining which network element(s) are to be evaluated in response to detecting excessive amount(s) of problematic metric data. The example NAFPS 116 can use the identifying information in isolating the network elements to be evaluated. In the illustrated example, the network element identifier 306 references the topology database 109 of FIG. 1 and/or the data storage 302 of FIG. 3 to obtain identifying information associated with the endpoint device(s) that supplied the metric data found to be problematic by the example threshold comparator 304. As described above, the topology database 109 and/or the data storage 302 include information related to the configuration of the service-provider network 102 such as, for example, a customer circuit designed to couple an endpoint device 104a-h to the network 102.

In some examples, the topology database 109 and/or the data storage 302 include information related to the VPN connectivity set(s) to which the endpoint devices 104a-h belong. In such instances, the example network element identifier 306 can determine one or more correlation points associated with multiple endpoint devices 104a-h. For example, when the threshold comparator 304 has used the connectivity set threshold 316 to determine that a certain VPN connectivity set supplied problematic metric data to the VANFAN server 120, the example network element identifier of FIG. 3 identifies one or more points of correlation associated with the potentially problematic VPN connectivity set. The example network element identifier 306 then references the topology database 109 and/or the data storage 302 to determine which network element(s), such as router(s), switch(es), and/or hub(s) correspond to the identified correlation point(s). Information indicative of the identified network element(s) can then be conveyed to the NAFPS 116 such that the NAFPS 116 may perform an isolated evaluation of those network element(s).

The example NAFPS trigger 310 of FIG. 3 receives information from the other components of the example VANFAN server 120, such as the threshold comparator 304 and/or the network element identifier 306, and sends an instruction to the NAFPS server 116 to perform the diagnostic evaluation described herein. In the illustrated example, the NAFPS trigger 310 sends the instruction along with identifying information received from the network element identifier 306 regarding which network element(s) are to be evaluated.

In response to the instruction generated by the NAFPS trigger 310, the example NAFPS server 116 of FIG. 1 performs the requested evaluation of the identified network element(s). Thus, for example, if metric data indicative of a potential or existing error condition (according to the threshold comparator 304) is collected from the first endpoint device 104a, the NAFPS server 116 diagnostically evaluates the first PE router 106a and/or any other corresponding network element(s), such as a router, switch, hub, and/or gateway associated with the first correlation point 110a and/or the second correlation point 110b.

The example trouble ticket generator 310 of FIG. 3 receives the results of the evaluation performed by the NAFPS 116. If the results indicate that any of the evaluated network element(s) are, for example, malfunctioning, incorrectly configured, in need of update(s), functioning improperly, etc., the example trouble ticket generator 310 creates a trouble ticket. An example trouble ticket includes information regarding the network element(s) determined to be malfunctioning, the results of the diagnostic evaluation from the NAFPS 116, specifications associated with the identified network element(s), identity(ies) of other network element(s) related to the identified network element(s), such as a fellow member of a VPN connectivity set, and/or any other information potentially useful in repairing the problematic condition(s). The example trouble ticket generator 310 is also capable of conveying trouble tickets to the trouble ticketing system 112 of FIG. 1.

Figure 4A:
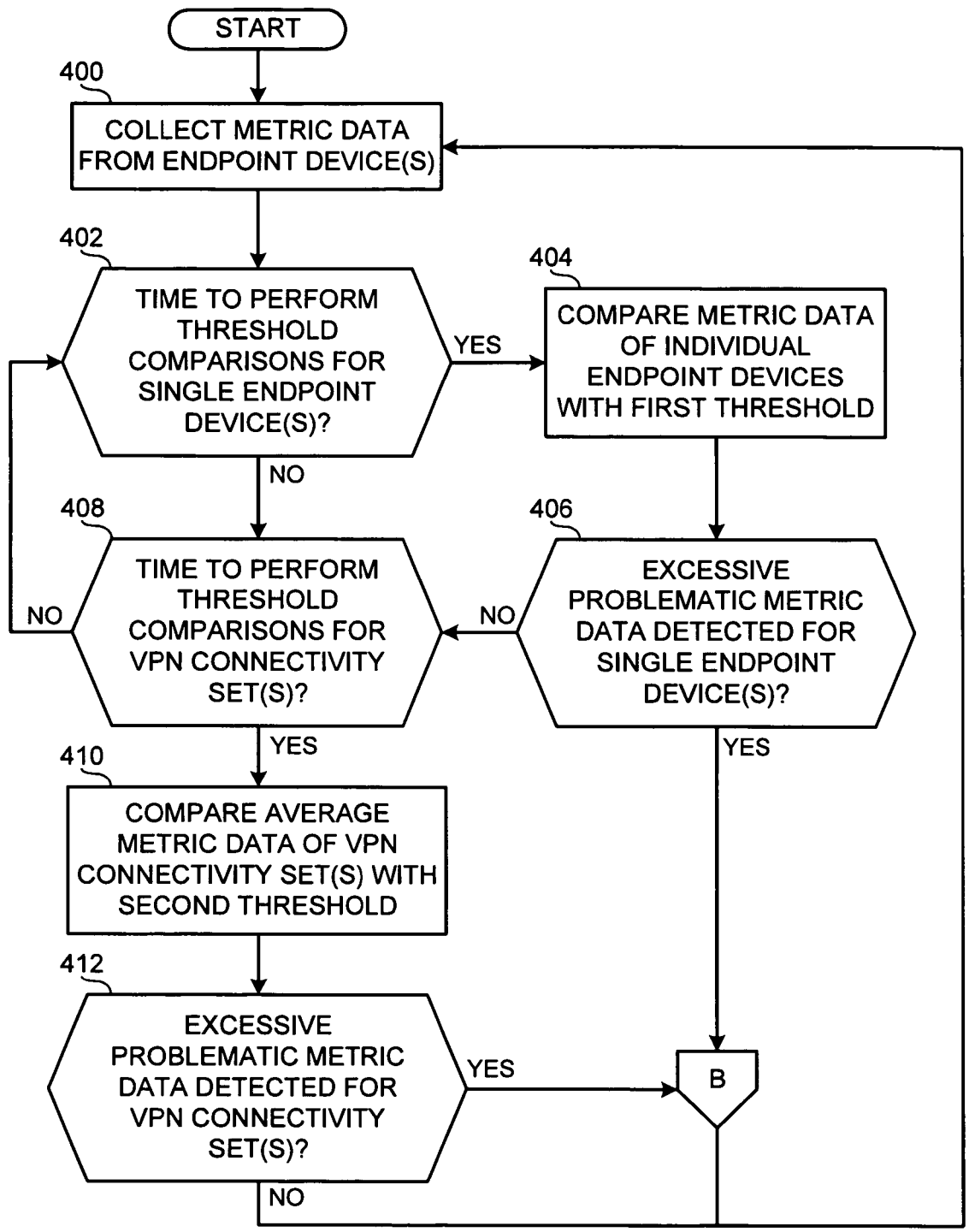
FIGS. 4A and 4B are a flow diagram representative of example machine readable instructions that may be executed to implement the example VANFAN server of FIGS. 1 and/or 3 to automatically detect error conditions in the example communication system of FIG. 1.
Figure 4B:
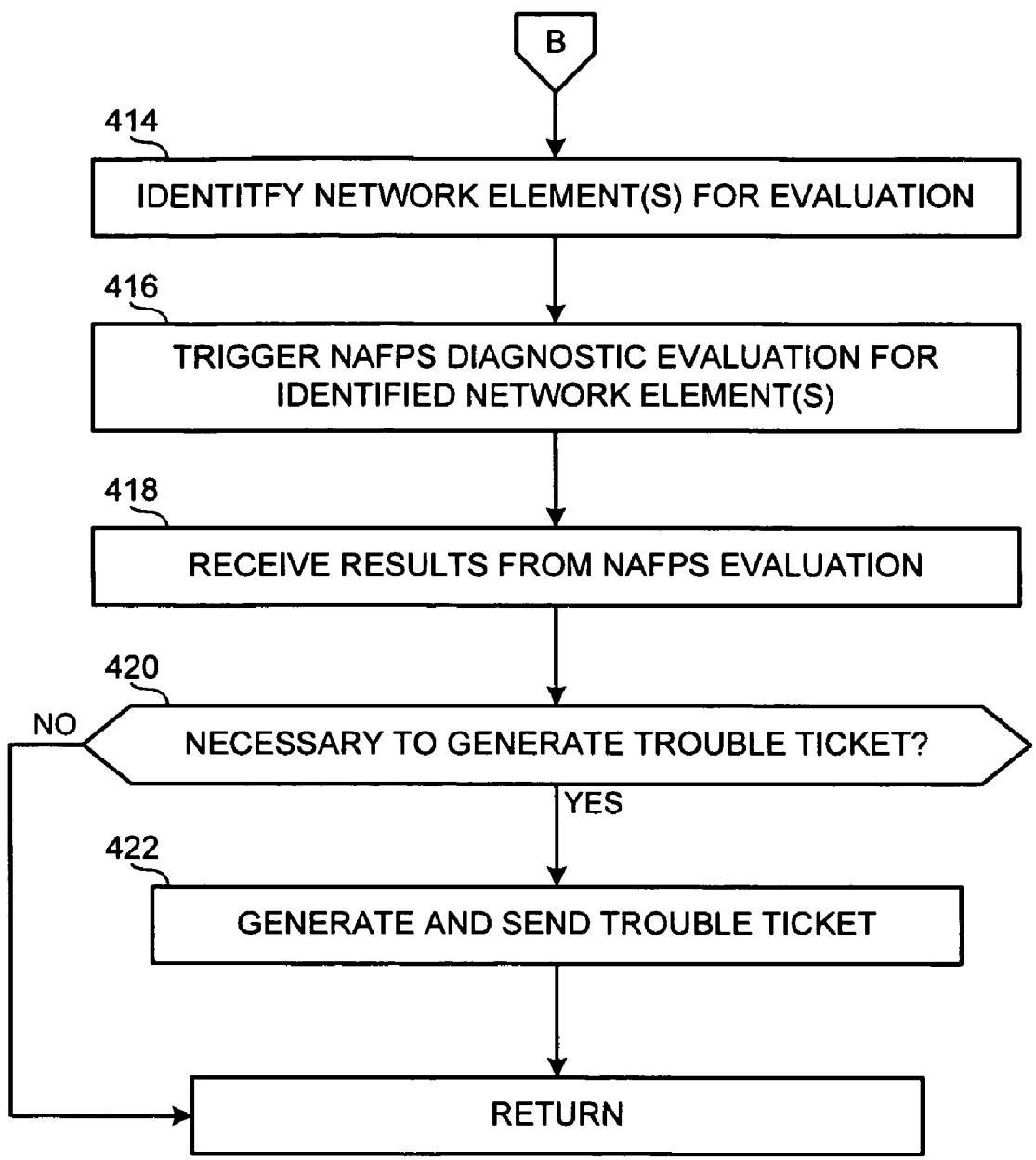

The flow diagrams depicted in FIGS. 4A and 4B are representative of machine readable instructions that can be executed to implement the example systems, methods, apparatus, and/or articles of manufacture described herein. In particular, FIGS. 4A and 4B depict a flow diagram representative of machine readable instructions that may be executed to implement the example VANFAN server 120 of FIGS. 1 and/or 3 to detect error conditions in one or more communication networks.

The example processes of FIGS. 4A and 4B may be performed using a processor, a controller and/or any other suitable processing device. For example, the example processes of FIGS. 4A and 4B may be implemented in coded instructions stored on a tangible medium such as a flash memory, a read-only memory (ROM) and/or random-access memory (RAM) associated with a processor (e.g., the example processor 510 discussed below in connection with FIG. 5). Alternatively, some or all of the example processes of FIGS. 4A and 4B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 4A and 4B may be implemented manually or as any combination(s) of any of the foregoing techniques, for example, any combination of firmware, software, discrete logic and/or hardware. Further, although the example processes of FIGS. 4A and 4B are described with reference to the flow diagrams of FIGS. 4A and 4B, other methods of implementing the processes of FIGS. 4A and 4B may be employed. For example, the order of execution of the blocks may be changed, and/or some of the blocks described may be changed, eliminated, sub-divided, or combined. Additionally, any or all of the example processes of FIGS. 4A and 4B may be performed sequentially and/or in parallel by, for example, separate processing threads, processors, devices, discrete logic, circuits, etc.

To begin, the example data collector 300 (FIG. 3) of the example VANFAN server 120 collects metric data from one or more endpoint devices 104a-h (FIG. 1) implemented in the example service-provider network 102 (FIG. 1) (block 400). As described above in connection with FIG. 2, the metric data includes a plurality of statistics associated with VPN connections established by the endpoint devices 104a-h and/or unsuccessful attempts to establish VPN connections by the endpoint devices 104a-h. In the illustrated example, the collection of the metric data is performed over period of time, such as one hour, as determined by a setting of the data collector 300. The collected metric data also includes timestamp(s) indicative of time(s) of collection and/or time(s) of VPN connectivity events, such as a connection failure and/or abnormal connection closure. The collected metric data is stored in the example data storage 302 (FIG. 3) in association with additional information such as, for example, information indicative of the endpoint device 104a-h from which the metric data was collected.

The example threshold comparator 304 (FIG. 3) of the example VANFAN server 120 then determines whether one or more comparisons involving metric data from a single endpoint device 104a-h are currently scheduled (block 402). As described above, the collected metric data may be analyzed with regards to one or more individual endpoint devices 104a-h and/or with regards to one or more groups of endpoint devices 104a-h, such as a VPN connectivity set. The example threshold comparator 304 includes one or more schedules to determine when to perform the corresponding threshold comparisons. If the threshold comparator 304 determines that comparison(s) involving individual endpoint device(s) 104a-h are scheduled (block 402), the threshold comparator 304 performs such comparison(s) (block 404). For example, the threshold comparator 304 compares a number of packets re-sent to a peer device (as described in connection with the example chart 200 of FIG. 2) by the first endpoint device 104a over a certain period of time to a threshold number of re-sent packets stored in the single device thresholds 314 (FIG. 3). The threshold number of re-sent packets stored in the single device thresholds 314 is set at a level such that a relatively greater amount of re-sent packets is indicative of an error condition existing in one or more network elements associated with the first endpoint device, such as the first PE router 106a. As described above, the single device thresholds 314 include any number and/or type(s) of threshold(s) corresponding to the different number and/or type(s) of metric data collected from the endpoint devices 104a-h.

If the results of the comparison(s) performed by the threshold comparator 304 at block 404 do not result in finding(s) of excessive problematic metric data associated with any single endpoint device 104a-h (block 406), or if no comparisons involving single endpoint devices 104a-h are scheduled (block 402), the threshold comparator 304 determines whether one or more comparisons involving metric data from a group of endpoint devices 104a-h are currently scheduled (block 408). An example group of endpoint devices 104a-h includes the members of a VPN connectivity set as defined by one or more of the correlation points 110a-d. If such comparison(s) are scheduled (block 408), the threshold comparator 304 performs the comparison(s) using metric data from the group of endpoint devices 104a-h (block 410). For example, the threshold comparator 304 compares an average latency (as described in connection with the example chart 200 of FIG. 2) experienced by the first, second, and third endpoint devices 104a-c over a certain period of time to a threshold latency stored in the connectivity set thresholds 316 (FIG. 3). The threshold latency stored in the connectivity set thresholds 316 is set at a level such that a relatively greater latency is indicative of an error condition existing in some network element associated with each of the first, second, and third endpoint devices 104a-h, such as the first PE router 106a. As described above, the connectivity set thresholds 316 include any number and/or type(s) of threshold(s) corresponding to the different number and/or type(s) of metric data collected from the endpoint devices 104a-h.

If the comparison(s) described above in connection with blocks 406 and 312 result in finding(s) that problematic metric data was collected from the endpoint device(s) 104a-h, such as finding that thresholds have been exceeded, control passes to block 414 of FIG. 4B. In particular, the example network element identifier 306 (FIG. 3) determines which network element(s) of the service-provider network 102 are to be diagnostically evaluated for faults and/or performance inefficiencies (block 414). Given the identity of the endpoint device(s) 104a-h from which the problematic metric data was collected, the example network element identifier 306 identifies the network element(s) to be evaluated by, for example, accessing the topology database 109 (FIG. 1). As described above, the example topology database 109 includes information related to the relationship(s) of the endpoint device(s) 104a-h to one another, customer circuit configurations associated with the endpoint devices 104a-h, VPN connectivity set information corresponding to the endpoint devices 104a-h, etc. Thus, the example network identifier 306 uses such information to determine which network element(s) are likely to be the cause of the error condition(s) detected from the endpoint device metric data.

Then, the example NAFPS trigger 308 instructs the example NAFPS 116 (FIG. 1) to perform the diagnostic evaluation for the network element(s) identified by the network element identifier 306 (block 416). As described above, the diagnostic evaluation performed by the example NAFPS 116 is capable of determining whether the corresponding network element(s) are, for example, malfunctioning, incorrectly configured, in need of update(s), functioning improperly, etc. The example trouble ticket generator 310 (FIG. 3) receives the results of the diagnostic evaluation (block 418). If the results indicate that any of the evaluated network element(s) are functioning improperly and/or otherwise in need of attention (block 420), the example trouble ticket generator 310 creates a trouble ticket and conveys the same to the trouble ticketing system 112 (FIG. 1) (block 422). An example trouble ticket includes information regarding the network element(s) determined to be malfunctioning, the results of the diagnostic evaluation from the NAFPS 116, specifications associated with the identified network element(s), identities of other network element(s) related to the malfunctioning network element(s), such as a fellow member of a VPN connectivity set, and/or any other information potentially useful in correcting the problematic condition(s).

As described above, the trouble ticketing system 112 may convey the trouble ticket to the workcenter(s) 118 (FIG. 1), which are capable of troubleshooting, diagnosing, and/or resolving the problem identified in the trouble ticket. For example, the workcenter(s) 118 may replace or reconfigure (or send an instruction to replace or reconfigure) the components, such as gateways, routers, and/or switches, of one of the PE routers 106*a-d* identified as a cause of an error condition.

Figure 5:
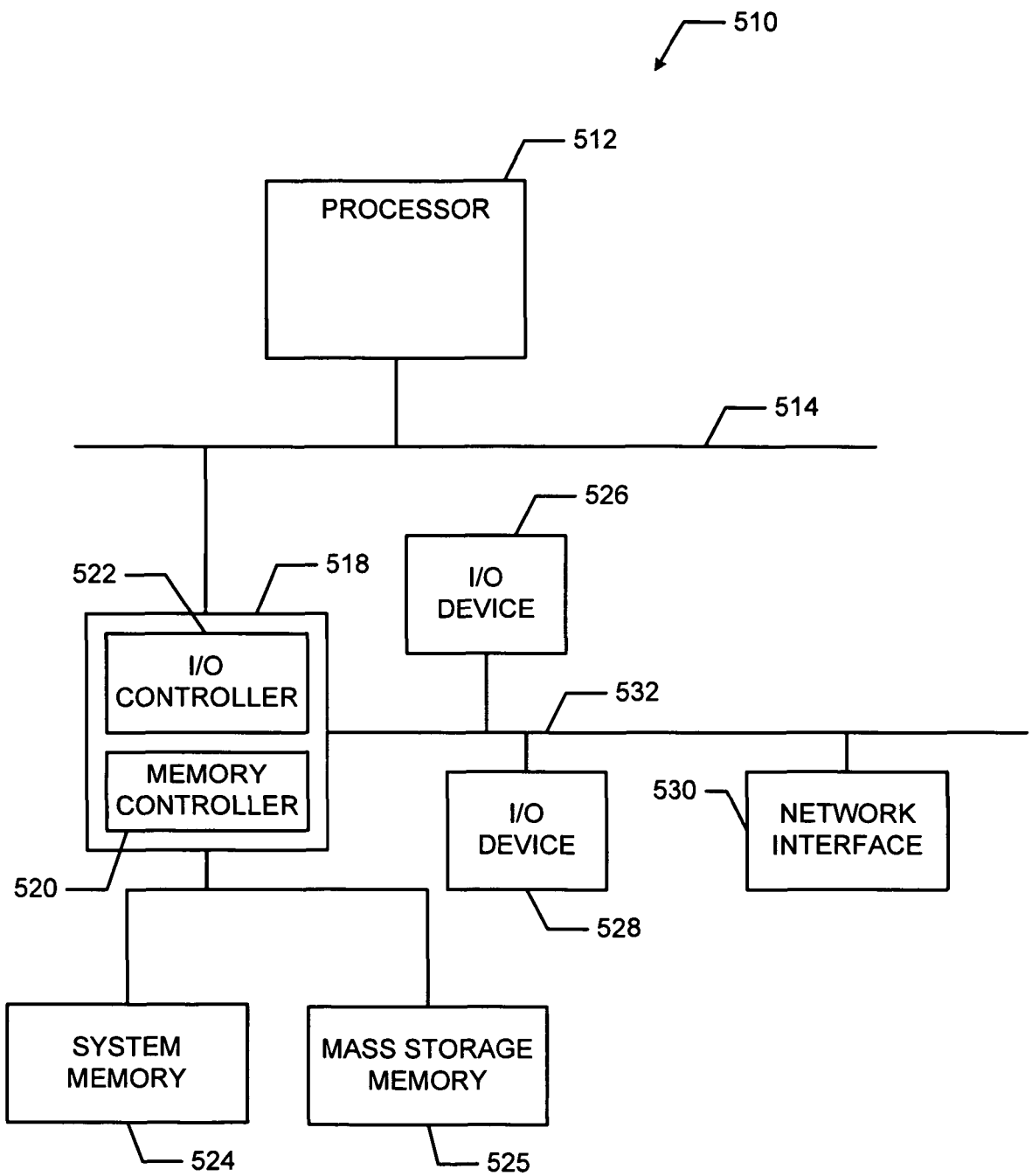
FIG. 5 is a block diagram of an example processor system that may be used to execute the machine readable instructions of FIGS. 4A and 4B to implement the example VANFAN server of FIGS. 1 and/or 3.

FIG. 5 is a block diagram of an example processor system 510 that may be used to execute the instructions of FIGS. 4A and 4B to implement the example VANFAN server 120 of FIGS. 1 and/or 3. As shown in FIG. 5, the processor system 510 includes a processor 512 that is coupled to an interconnection bus 514. The processor 512 may be any suitable processor, processing unit or microprocessor. Although not shown in FIG. 5, the system 510 may be a multi-processor system and, thus, may include one or more additional processors that are different, identical or similar to the processor 512 and that are communicatively coupled to the interconnection bus 514.

The processor 512 of FIG. 5 is coupled to a chipset 518, which includes a memory controller 520 and an input/output (I/O) controller 522. The chipset 518 provides I/O and memory management functions as well as a plurality of general purpose and/or special purpose registers, timers, etc. that are accessible or used by one or more processors coupled to the chipset 518. The memory controller 520 performs functions that enable the processor 512 (or processors if there are multiple processors) to access a system memory 524 and a mass storage memory 525.

The system memory 524 may include any desired type of volatile and/or non-volatile memory such as, for example, static random access memory (SRAM), dynamic random access memory (DRAM), flash memory, read-only memory (ROM), etc. The mass storage memory 525 may include any desired type of mass storage device including hard disk drives, optical drives, tape storage devices, etc.

The I/O controller 522 performs functions that enable the processor 512 to communicate with peripheral input/output (I/O) devices 526 and 528 and a network interface 530 via an I/O bus 532. The I/O devices 526 and 528 may be any desired type of I/O device such as, for example, a keyboard, a video display or monitor, a mouse, etc. The network interface 530 may be, for example, an Ethernet device, an asynchronous transfer mode (ATM) device, an 802.11 device, a DSL modem, a cable modem, a cellular modem, etc. that enables the processor system 510 to communicate with another processor system.

While the memory controller 520 and the I/O controller 522 are depicted in FIG. 5 as separate blocks within the chipset 518, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method of detecting an error condition in a communication network, comprising:
   collecting first metric data from a first endpoint device, the first metric data being related to a first connection between the first endpoint device and a communication network;
   collecting second metric data from a second endpoint device, the second metric data being related to a second connection between the second endpoint device and the communication network, the first and second endpoint devices being associated with a connectivity set having a point of correlation;
   performing a first comparison between the first metric data and a first threshold according to a first schedule;
   determining an average of the first metric data and the second metric data;
   performing a second comparison between the average and a second threshold according to a second schedule different from the first schedule;
   when the first comparison is indicative of a first error condition, accelerating the second schedule;
   when the second comparison is indicative of a second error condition, identifying a network element based on the point of correlation; and
   performing an evaluation of the network element.

2. A method as defined in claim 1, further comprising generating a trouble ticket when the evaluation of the network element indicates that the network element is functioning improperly.

3. A method as defined in claim 2, further comprising automatically forwarding the trouble ticket to a workcenter capable of addressing problems associated with the network element.

4. A method as defined in claim 1, wherein identifying the network element comprises referencing a topology database including information related to a first circuit corresponding to the first endpoint device and a second circuit corresponding to the second endpoint device.

5. An apparatus to detect an error condition in a communication network, comprising:
   a data collector to collect first metric data from a first endpoint device and second metric data from a second endpoint device, the first metric data being related to a first connection between the first endpoint device and a communication network, the second metric data being related to a second connection between the second endpoint device and the communication network, the first and second endpoint devices being associated with a point of correlation;
   a comparator to perform a first comparison according to a first schedule to determine whether the first metric data is indicative of a first error condition, the comparator to perform a second comparison according to a second schedule to determine whether an average of the first metric and the second metric is indicative of a second error condition, the second schedule to be accelerated when the first comparison is indicative of the first error condition;

a network element identifier to identify a network element associated with the point of correlation between the first and second connections; and an analyzer to evaluate the network element associated with the point of correlation.

6. An apparatus as defined in claim 5, further comprising a trouble ticket generator to generate a trouble ticket when the analyzer indicates that the network element is functioning improperly.

7. An apparatus as defined in claim 6, wherein the trouble ticket generator is to automatically forward the trouble ticket to a workcenter.

8. An apparatus as defined in claim 5, wherein the comparator is to determine if the first metric data is indicative of the first error condition by comparing the first metric data with a threshold.

9. An apparatus as defined in claim 5, wherein the comparator is to determine whether the average of the first and second metric data is indicative of the second error condition by comparing the average of the first and second metric data to a threshold.

10. An apparatus as defined in claim 5, wherein the network element identifier is to identify the network element by referencing a topology database including information related to the first connection corresponding to the first endpoint device and the second connection corresponding to the second endpoint device.

11. An apparatus method as defined in claim 5, wherein the communication network comprises a virtual private network.

12. An apparatus as defined in claim 5, wherein the network element comprises at least one of a router, a hub, a switch, or a gateway.

13. A communication system, comprising:

a service-provider network including a plurality of edge routers to implement a virtual private network (VPN);

an application installed on first and second endpoint devices communicatively coupled to the service-provider network, the application to collect metric data related to connections to the VPN associated with the first and second endpoint devices, the first and second endpoint devices being associated with a first network element; and a first server to receive the metric data from the first and second endpoint devices, to analyze the metric data according to a first schedule to detect a first error condition in the first endpoint device having a potential to cause service interruptions of the VPN and in response to detecting the first error condition, the first server to accelerate the second schedule, to analyze a composite value associated with the metric data according to a second schedule to detect a second error condition, and in response to detecting the second error condition automatically identify a point of correlation associated with the first and second endpoint devices.

14. A communication system as defined in claim 13, further comprising a second server to evaluate a second network element in response to an indication from the first server that the first error condition has been detected.

15. A communication system as defined in claim 14, further comprising a trouble ticket generator to generate a trouble ticket in response to the second server determining that the second network element is functioning improperly.

16. A communication system as defined in claim 13, wherein the first server identifies the first network element by referencing a topology database including information related to a first circuit corresponding to the first endpoint device and a second circuit corresponding to the second endpoint device.

* * * * *